US012703518B2

(12) United States Patent
Laskri et al.

(10) Patent No.: US 12,703,518 B2
(45) Date of Patent: Aug. 11, 2026

(54) DEPLOYABLE ON-BOARD OPTICAL FIBER LINK FOR AERIAL DRONES

(71) Applicant: Sedi-Ati Fibres Optiques, Evry Courcouronnes (FR)

(72) Inventors: Samir Laskri, Ris Orangis (FR); Hervé Aube, La Norville (FR); Jean-François Vinchant, La Ferte-Alais (FR)

(73) Assignee: Sedi-Ati Fibres Optiques, Evry Courcouronnes (FR)

( * ) Notice: Subject to any disclaimer, the term of this patent is extended or adjusted under 35 U.S.C. 154(b) by 0 days.

(21) Appl. No.: 18/728,330

(22) PCT Filed: Jan. 6, 2023

(86) PCT No.: PCT/EP2023/050235
§ 371 (c)(1),
(2) Date: Dec. 20, 2024

(87) PCT Pub. No.: WO2023/135062
PCT Pub. Date: Jul. 20, 2023

(65) Prior Publication Data

US 2025/0333197 A1 Oct. 30, 2025

(30) Foreign Application Priority Data

Jan. 12, 2022 (FR) ....................................... 2200224

(51) Int. Cl.
*B64U 20/80* (2023.01)
*B64U 10/13* (2023.01)
(Continued)

(52) U.S. Cl.
CPC ............. *B64U 20/80* (2023.01); *B64U 10/13* (2023.01); *B64U 10/60* (2023.01); *G02B 6/4458* (2013.01);
(Continued)

(58) Field of Classification Search
CPC ........ B64U 10/00; B64U 10/13; B64U 10/50; B64U 10/60; B64U 20/80; B64U 2101/30;
(Continued)

(56) References Cited

U.S. PATENT DOCUMENTS 5,167,382 A 12/1992 Rochester et al.
7,510,142 B2 3/2009 Johnson
(Continued)

FOREIGN PATENT DOCUMENTS

CN 213323762 U * 6/2021
EP 0687626 A1 12/1995
(Continued)

OTHER PUBLICATIONS

French Search Report for Application No. 2200224 dated Oct. 28, 2022, 2 pages.
(Continued)

*Primary Examiner* — Joshua E Rodden
(74) *Attorney, Agent, or Firm* — TraskBritt

(57) ABSTRACT

A real-time high-definition imaging system includes a rotary-wing aerial drone that is remote-controlled by way of a control device. The drone includes at least one high-definition image sensor, a signal processing module for producing an image stream. The system includes real-time transmission means for transmitting the image stream to a fixed station. The transmission means include an optical fiber wound on a fixed reel attached to the drone with a vertical axis. An output of the optical fiber is directed downward when the drone is in the horizontal position. The optical fiber is coated with an adhesive substance to prevent the optical fiber from prematurely unwinding. One of the ends of the optical fiber is coupled to the signal processing module of the drone by an optical connector and the other
(Continued)

end is coupled to an optical connector of a processing module of the fixed station.

9 Claims, 2 Drawing Sheets

(51) Int. Cl.
*B64U 10/60* (2023.01)
*G02B 6/44* (2006.01)
*H04N 23/80* (2023.01)
*B64U 101/30* (2023.01)

(52) U.S. Cl.
CPC ......... *H04N 23/80* (2023.01); *B64U 2101/30* (2023.01); *B64U 2201/202* (2023.01)

(58) Field of Classification Search
CPC .......... B64U 2201/20; B64U 2201/202; G02B 6/4458; H04N 23/80
USPC ........................................................ 244/118.1
See application file for complete search history.

(56) References Cited

U.S. PATENT DOCUMENTS 7,631,834 B1 * 12/2009 Johnson ................. B64U 50/14 244/175
9,676,481 B1 * 6/2017 Buchmueller ....... G05D 1/0094
11,161,712 B2 * 11/2021 Purkis .................. G02B 6/4458
12,012,188 B2 * 6/2024 Bosma ..................... B64D 1/22
2007/0200027 A1 8/2007 Johnson
2017/0146325 A1 * 5/2017 Edminster ............... F41H 11/16
2019/0084672 A1 3/2019 Guetta et al.
2021/0316858 A1 * 10/2021 Pargoe ................... B64U 10/14
2024/0210956 A1 * 6/2024 Barawkar ............ G05D 1/2287
2025/0262814 A1 * 8/2025 Ji .......................... B29C 64/112
2025/0274077 A1 * 8/2025 Bedrich ................. G05D 1/689

FOREIGN PATENT DOCUMENTS

EP 0660071 A1 3/1996
EP 3310656 B1 4/2018
WO 2010/092253 A1 8/2010
WO 2013/150442 A1 10/2013
WO 2013/162128 A1 10/2013

OTHER PUBLICATIONS

International Search Report for Application No. PCT/EP2023/050235 dated Mar. 16, 2023, 2 pages.
International Written Opinion for Application No. PCT/EP2023/050235 dated Mar. 16, 2023, 5 pages.

* cited by examiner

DEPLOYABLE ON-BOARD OPTICAL FIBER LINK FOR AERIAL DRONES

CROSS REFERENCE TO RELATED APPLICATIONS

This application is a national phase entry under 35 U.S.C. § 371 of International Patent Application PCT/EP2023/050235, filed Jan. 6, 2023, designating the United States of America and published as International Patent Publication WO 2023/135062 A1 on Jul. 20, 2023, which claims the benefit under Article 8 of the Patent Cooperation Treaty to French Patent Application Serial No. FR2200224, filed Jan. 12, 2022.

TECHNICAL FIELD

The present disclosure relates to the field of aerial drones for high-definition imaging. The applications of high-definition imaging taken by aerial drones are developing in the event industry, for sports competitions, concerts, open-air shows, audiovisual productions, gatherings, urban planning, land and sea surveillance and video surveillance of people and property, surveillance of maritime areas and rescue aid, in industrial applications, such as visual inspection of industrial infrastructures, metal structures, cranes, antennas, wind turbines, engineering structures, or even for agricultural applications, notably with multi-spectral high-definition cameras, or even groups of cameras to produce 3D immersive videos.

BACKGROUND

For these applications, flying platforms are usually used that can support an on-board load consisting of a high-definition image capture module, such as one or more 4K cameras. The drones covered by the present disclosure are all so-called rotary-wing flying machines, remotely piloted by way of a control device. Rotary-wing drones comprise all known forms of scaled-down helicopter models.

Some wire-type drones use systems comprising a wire, a wire winder comprising a wire winding drum and an electric motor to drive the drum. The wire is then held in place with an adjusted tension that allows the drone to move easily without the wire touching the ground. For example, documents WO2010/092253, WO2013/162128, WO2013/150442 and EP3310656B1 disclose wired systems linking a drone to its ground base. The volume of space in which the drone can operate is a half-sphere with a radius the length of the wire. The possible crash zone of the drone is a disc with a radius the length of the wire. Wired drones are used, in particular, in sensitive areas where the drone must not be able to venture beyond certain limits. Sensitive areas include airports, critical industries and populated areas.

However, most drones are controlled by a radio-frequency link via a transmitter controlled by a pilot. For imaging applications, there is the problem of video data transmission. Radio frequency links between the drone and a ground station are generally unsuitable for reasons of data rate, signal robustness, size, autonomy and weight of on-board equipment for processing camera data, establishing a session with the ground, and processing protocols and signal transport layers. It is therefore generally preferable to store digital data in on-board RAM, which can be used after the drone's return.

U.S. Pat. No. 7,510,142 discloses a flying robot equipped with counter-rotating propellers driven by an electric motor powered by a cord connected to an electrical ground station. This document specifies that, optionally, a thin optical fiber can be associated with this electrical cord. This electric cord is wound onto a reel that can be motorized to allow winding and unwinding. It relates to an on-board reel in a flying robot. The cable reel (electrical wire+optical fiber) is attached on a motorized rotation axis to unwind and wind the cable. The cable is uncoiled by the turns on the outer surface of the reel. The fiber is used to transfer image streams.

Patent application EP0687626 relates to an aircraft connected to a ground station by a wired link provided by an optical fiber, the majority of whose length is initially wound on a reel on board the aircraft. It features an optical fiber reel attached on a free rotation axis. The fiber unwinds as the aircraft moves forward. The fiber is uncoiled by the turns on the outer surface of the reel. The fiber is used to control the aircraft (outward journey) and to transfer image streams.

Patent application US2019084672 discloses a reel on board a platform carried by a balloon inflated with light air. The optical fiber reel is attached on a free rotation axis. The fiber unwinds as the platform moves forward. The fiber is uncoiled by the turns on the outer surface of the reel. The fiber is used to transfer image streams. The optical fiber reel is installed at the rear end of the platform, and the optical fiber unwinds from the reel and deploys behind the device as it moves forward.

Patent application EP0660071 discloses a missile flying at speeds in excess of 800 km/h, with no imaging system. A block of wound optical fiber is on board a missile. The fiber unwinds as the missile deploys at high speed. The fiber is uncoiled by the turns on the surface of the ring gear. The fiber is used for missile control and detection.

Patent application U.S. Pat. No. 5,167,382 also discloses a missile comprising an optical fiber block consisting substantially of a plurality of layers of optical fiber supported on an inner surface of the housing and having one end of the optical fiber positioned to unwind from an inner surface of the optical fiber block, at least a portion of the optical fiber having an amount of adhesive thereon sufficient to produce a peel force of about 0.01 to about 2 grams. The optical fiber cartridge in question is an internal unwinding means, wherein the optical fiber pack is wound onto the inner surface of the cartridge housing. A canister housing (cone-shaped) of wound optical fiber is carried in a missile. This optical fiber canister housing is fixed. The fiber unwinds as the missile deploys at high speed. The fiber is uncoiled laterally. The fiber is used for missile control and detection.

The drone is a piloted aerial vehicle for three-axis displacement and horizontal flight at speeds of less than 150 km/h. It offers great mobility for highly variable trajectories with horizontal changes of direction and small radii of curvature, for applications such as photogrammetry, and for movement in a predominantly horizontal plane at speeds of between 1 and 20 m/s. Solutions using a rotating reel are unsuitable, as the inertia of the drum causes the extremely fragile fiber to break during transient acceleration, and unnecessary fiber release during deceleration, which can lead to entanglement.

The solutions proposed for missiles do not fall within the scope of the present disclosure, since a missile adopts a straight trajectory with a speed of several hundred meters per second, and requires robust and heavy optical fibers, which are unsuitable for aerial drones according to the invention.

BRIEF SUMMARY

In order to address these drawbacks, the present disclosure relates, according to its most general sense, to a flying drone system for real-time high-definition imaging.

The system comprises a rotary-wing aerial drone, remotely piloted by way of a control device, the drone being equipped with at least one high-definition image sensor, as well as a module for processing signals from the sensors to produce an image stream and means for real-time transmission of the image stream to a fixed station, wherein the real-time transmission means are constituted by an optical fiber mounted on a reel secured to the drone, one end of the fiber being coupled to the signal processing module of the drone via an optical connector and the other end being coupled to an optical connector of a processing module of the fixed station.

The reel is attached to the drone with its axis oriented vertically, and a fiber outlet directed downward when the aerial drone is in a horizontal position.

Advantageously, the optical fiber is a single-mode fiber with a protective sheath, coated with an adherent substance such as grease, to prevent unwanted unwinding of the optical fiber wound on the reel.

According to a preferred embodiment, the reel is a single-use reel having means for attachment to a platform of the drone.

According to a first variant, the optical fiber is released from the reel from the inside, starting with the inner turns.

According to an alternative variant, the optical fiber is released from the reel from the outside, starting with the outer turns.

Advantageously, the reel has a cross-section of less than 100 mm.

According to another particular embodiment, the fixed station comprises means for transmitting digital data, and in that the drone comprises a module for controlling the drone's functionalities based on the data received at the on-board end of the optical fiber.

Advantageously, the drone on the one hand, and a cockpit on the other, each comprise an optoelectronic device transforming the photons conveyed by the fiber into two distinct pieces of electrical information, one corresponding to the control signals and the other to the video stream.

The present disclosure also relates to a single-use optical fiber reel for use in the above-mentioned real-time high-definition imaging system, wherein it has attachment means for fixed link to the aerial drone and supports an optical fiber winding held by an adhesive substance.

The present disclosure also relates to a drone for use in the above-mentioned real-time high-definition imaging system, wherein it has an attachment means for a reel of optical fiber and an optical connector for connecting the upstream end of an optical fiber.

Advantageously, such a drone comprises an optoelectronic device transforming the photons conveyed by the fiber into two distinct items of electrical information corresponding, on the one hand, to the signals controlling the functionalities of the drone and, on the other hand, to the transmission of a video stream.

BRIEF DESCRIPTION OF THE DRAWINGS

The present disclosure will be described in more detail with reference to non-limiting example embodiments specifying the aforementioned advantages and considerations. A more specific description of the invention briefly described above is shown by the accompanying drawings, where.

DETAILED DESCRIPTION

It should be noted that the dimensional details, modes of implementation and implementation details are merely non-limiting examples.

Figure 1:
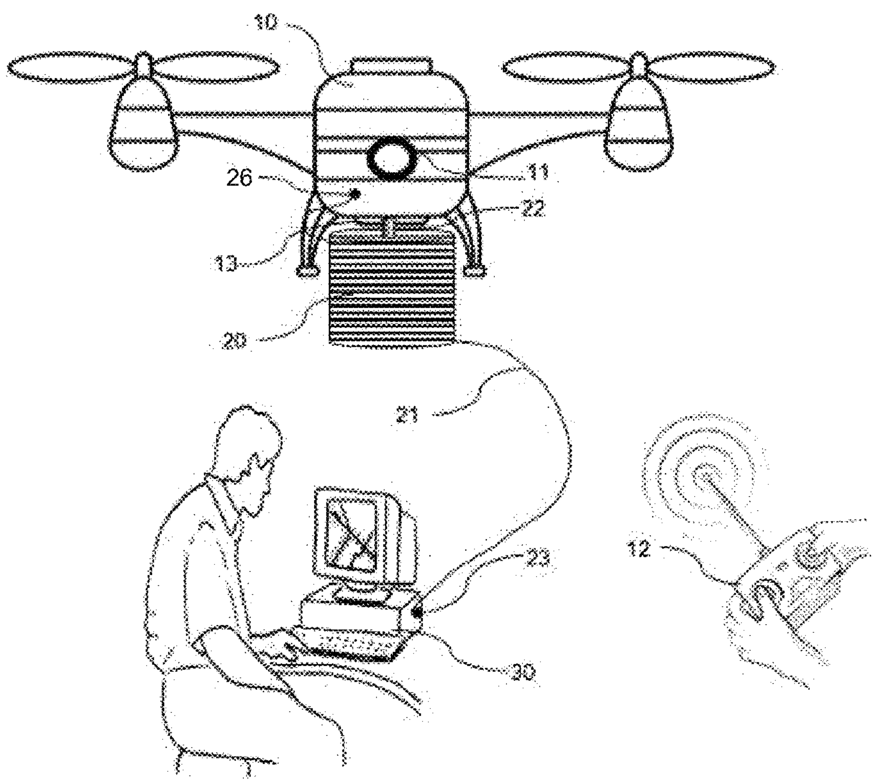
FIG. 1 shows a schematic view of a system according to the present disclosure.

Referring to FIG. 1, the system according to the present disclosure uses a flying drone (10) equipped with a high-definition 4K (or even higher definition) image sensor (11), for example, a model marketed under the name "DJI® Mavic® 2 Zoom" controlled by a housing (12) via radio frequency.

The present disclosure relates to the transmission of a real-time video stream via an optical fiber, preferably single-mode, linking an optoelectronic coupler on board the drone to an optoelectronic coupler equipping a ground station during flight. The very light weight of the optical fiber (less than one kilogram per thousand meters of fiber) and its mechanical strength mean that such a link can be provided without significantly degrading the flight performance of the aerial drone, while enabling high-speed CWDM and DWDM transmissions over several kilometers.

This fiber is single-use, for a single flight, allowing any number of trajectories, without the need for a return path identical to the outward one. The fiber is broken and abandoned at the end of the image acquisition mission.

However, if only part of the wound fiber is used, the reel with the remaining fiber can be reused for a new mission, after reconnecting the free end to the control station (30).

This optical fiber (21) is prepared in the form of a reel formed by winding the fiber, preferably without a hub, to enable axial unwinding, preferably from the inside, to enable the fiber to be deployed at very high speeds, which can exceed 100 km/hour, and very long distances, several kilometers or even tens of kilometers, without causing fiber breakage.

To ensure that the turns adhere to one another when not being unwound, a binder of suitable consistency coats the optical fiber sheath. The consistency is determined to prevent unwinding in the absence of traction on the downstream end of the optical fiber, and to exert a low resistance when such traction is exerted to prevent the optical fiber from breaking in the event of sudden acceleration of the drone or travel at high speed. Typically, this is a sprayable or viscous binder with a consistency of between 2 and 4 NLGI, but the skilled artisan will be able to select the type of binder and the consistency best suited to reconciling resting grip and reduced braking during unwinding via successive experiments.

This reel (20) is mounted on the drone in a fixed, rather than rotating, position. It is not a winch, but a spool for axial unwinding when the aerial drone is in motion. The drone can be fitted with a quick-coupling plate of the reel, via means such as clipping, or lockable engagement (22), for quick and reliable attachment of the reel to the underside of the drone. This attachment means can also be provided on the battery (13) attached to the underside of the drone (10) or on the housing surrounding the batteries.

The upstream end of the fiber (21) comprises an optical connector (26) coupled to a complementary connector of the drone (10).

The downstream end of the fiber (21) is coupled to a ground station (30) by another connector (23) to transmit the video stream to equipment for real-time viewing and/or recording of the video stream for later use.

The optical fiber (21) is originally wound completely to form the reel (20). As the drone (10) moves away, the optical fiber (21) is released by gravitational unwinding, a few grams of traction being sufficient to ensure unwinding. Optionally, a brake can be provided to increase resistance to unwinding. The fiber (21) sheath can be coated with a low-adhesion binder to slow down unwinding as the drone (10) moves. Typically, the fiber (21) is a single-mode fiber with a 250 μm epoxy acrylate coating and a binder. The reel (20) has a height of 65 mm and a diameter of 85 mm.

Alternatively, the reel (20) consists solely of fiber wound on itself, without a core, the fiber optionally being coated with a sticky or tacky coating, and clamped between two transverse flanges (41, 42) bearing on the two transverse end faces (24, 25) of the reel (20).

Using the Optical Fiber to Transmit Commands

Optionally, the optical fiber (21) can also be used to transmit data and commands from the fixed station (30) to the drone (10), for example, in redundancy with the commands transmitted by the remote control (12), particularly in the event of electromagnetic interference or poor atmospheric conditions, or as a replacement for radio frequency control.

The fiber link enables the drone (10) to be piloted, while video is brought back to the pilot, in disturbed areas: places where HF transmission is forbidden (airports, refineries, etc.) or disturbed (underground galleries, bunkers, basements, etc.), among other military missions known as "tactical indoor."

Another application: the drone can operate in very small or restricted areas without fear of being blocked by the fiber, which would act as a "leash," since the drone carries its reel and deploys it as it moves (only a few grams of traction are needed for deployment).

In this variant, the drone (10) is equipped with an opto-electronic multiplexer, as is the fixed station (30).

Multiplexing consists in carrying two different wavelengths in a single fiber (21):

- one wavelength is dedicated to piloting the machine (generally 1300 nm); and
- the other wavelength is dedicated to video transmission (generally 1550 nm, as the available bandwidth is even greater).

The drone's multiplexer, on the one hand, and the cockpit's multiplexer, on the other, transform the photons carried by the fiber into two separate pieces of electrical information.

For this variant, the drone (10) is advantageously equipped with a computer controlling, in a known manner, a return to a reference position in the event communication is lost, for example, by breakage of the optical fiber (21).

Preferred Variant of the Optical Fiber Reel

Figure 2:
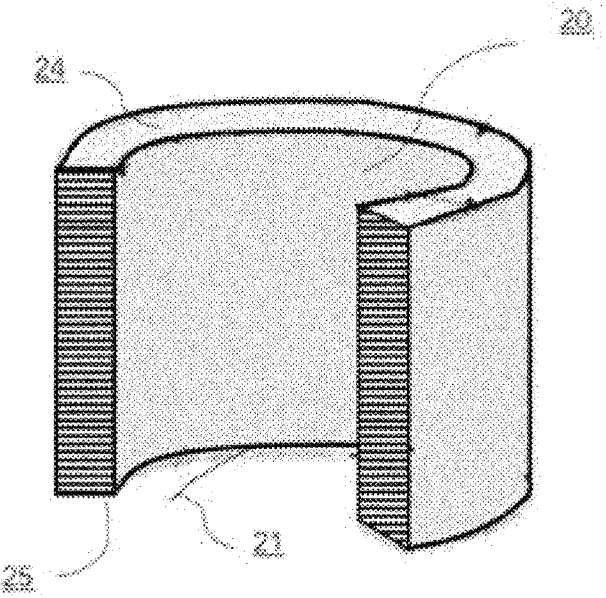
FIG. 2 schematically shows a partial schematic view of an optical fiber reel according to the present disclosure.

The preferred embodiment of the present disclosure relates to the use of a fixed optical fiber reel, that is, one that does not rotate about an axle secured to the drone, attached vertically to a drone with horizontal propellers and oriented toward the ground when the drone is in horizontal flight. The reel shown in FIG. 2 consists of a self-supporting winding of fibers coated with a viscous adherent substance to form a hollow reel (20), the fiber of which unwinds from the inner surface of the reel in a substantially axial downward direction, by way of a slight traction compensating for the peel force of the adhesive substance and the mechanical strength resulting from the entanglement between adjacent layers of fibers. This traction can be very small and simply result from the weight of the fiber already released, so that the force exerted on the unwinding area is practically zero.

The creation of mechanically coherent reels without a central hub, since unwinding takes place from the inside of the reel, which makes unwinding more fluid than from the outside, is made more difficult by the intrinsic stiffness of the silica making up the optical fiber, which behaves like a spring. The wound fiber tends to slacken outwards and, depending on the spooling, toward the ends of the reel. To achieve this coherence, varnishes diluted in a solvent are applied to the optical fiber in a bath.

The process is as follows: the fiber is wound onto a winder with a more or less pronounced spooling on a mandrel-shaped tool formed by a core with a flange at each end.

This mandrel, which supports the reel, is then immersed in a bath of solvent and varnish. Finally, after impregnation, it is removed from the bath and set aside to dry.

The varnish lightly glues the fiber turns, and the mandrel is removed by disassembling one of the flanges to allow the reel to slide axially along the tubular core. The resulting reel is self-supporting and easy to handle (which would not be the case without varnish).

A preferred alternative consists in replacing the coating product with a casing external to the reel.

Figure 3:
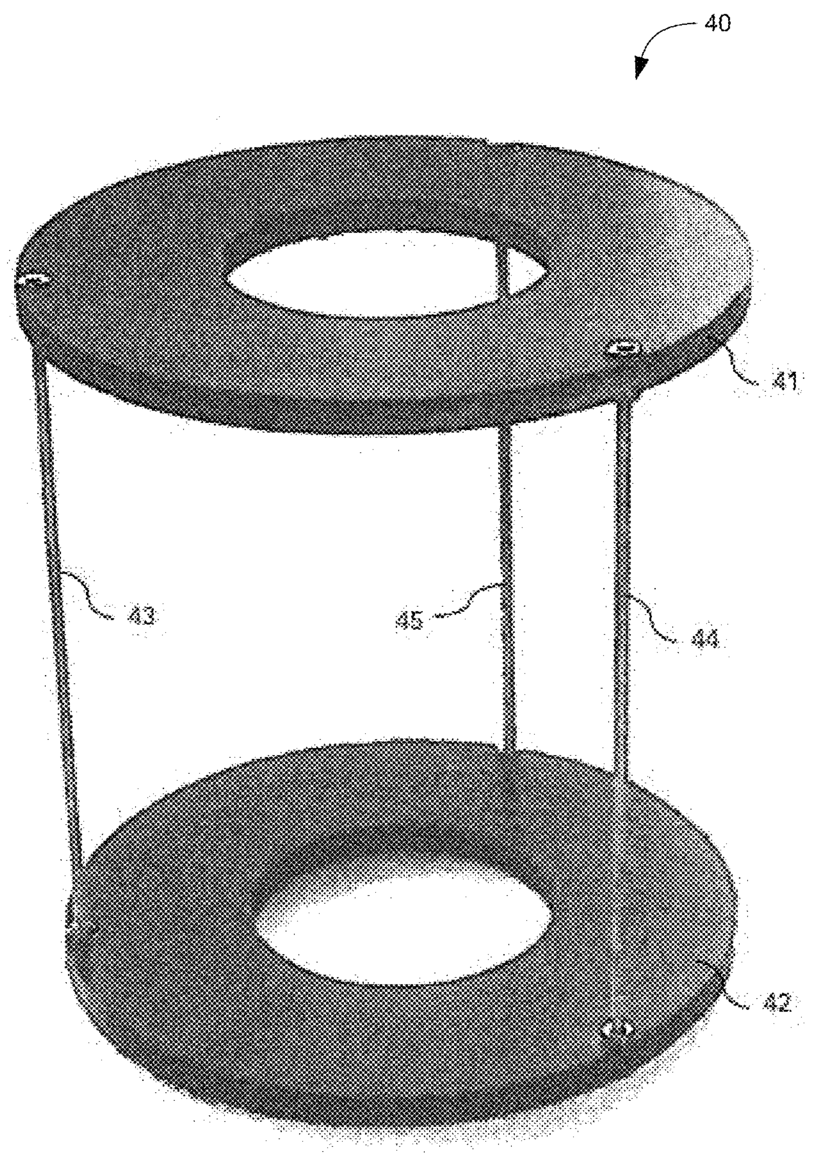
FIG. 3 shows a schematic view of a cohesive casing of an optical fiber reel according to the present disclosure.

This casing is made up of two perforated circular flanges (41, 42), held in place by rods (43 to 45) as shown in FIG. 3.

The reel is spooled around a removable mandrel as disclosed above. The two flanges (41, 42) of the outer casing are placed against the flanges of the mandrel and the optical fiber is wound around the mandrel core.

When winding is complete, the flanges (41, 42) are secured to the casing (40) by bolted rods (43 to 45) located at the periphery of the flanges (41, 42). Other linking systems may be used.

The tooling is then dismantled to allow the core to be removed: the resulting reel is mechanically coherent, as it is held between the two flanges (41, 42) of the outer casing (40).

According to a variant, the reel is dipped in a varnish/solvent mixture with a very low proportion of varnish (less than 1%, typically 0.2 to 0.3%): this proportion of varnish would be insufficient to make the reel self-supporting, without the flanges (41, 42), but ensures better mechanical retention of the turns on the resulting reel.

According to yet another variant, the same tooling as above is used, consisting of a removable reel. The two flanges of the outer casing are placed against the flanges of the tooling and the fiber is wound.

During winding, the fiber is coated with grease to ensure a light bonding effect of the fiber.

Grease alone would not ensure coherence of the reel without the flanges, since the resulting bond remains flexible.

When winding is complete, the flanges (41, 42) are secured to the casing (40) by bolted rods (43 to 45) located at the periphery of the flanges (41, 42) (other retention system can be used).

Then the tooling is dismantled: the resulting reel is mechanically coherent, as it is held between the two secured flanges.

Optionally, polymerizable silicone beads can be added to the outside of the reel to improve overall coherence and prevent unwinding of the outer layers of the fiber.

These variants make it easier to produce a reel with internal unwinding, and to reduce handling times. Unwinding is smoother and less jerky, without creating bends that are harmful to data transmission on the fiber, and the fiber turns no longer come out in bundles.

The invention claimed is:

1. A real-time high-definition imaging system, comprising:

a fixed station;

a rotary-wing aerial drone comprising:

at least one high-definition image sensor, and a reel that is fixed to the aerial drone and that has an axis oriented vertically when the aerial drone is in a horizontal position; and an optical fiber wound onto the reel, an output of the optical fiber being directed downward when the aerial drone is in the horizontal position, a first end of the optical fiber being coupled to an optical connector of the aerial done and a second of the optical fiber being coupled to the fixed station, the optical fiber configured for real-time transmission of an image detected by the at least one high-definition image sensor to the fixed station.

2. The imaging system of claim 1, wherein the optical fiber is coated with an adhesive substance to prevent premature unwinding of the optical fiber.

3. The imaging system of claim 1, wherein the reel comprises an outer casing having two flanges, and wherein the optical fiber is wound between the two flanges to form a hubless reel.

4. The imaging system of claim 1, wherein the optical fiber is configured to be released from the reel from an inside of the wound optical fiber, starting with inner turns of the optical fiber.

5. The imaging system of claim 1, wherein the optical fiber is configured to be released from the reel from an outside of the optical fiber, starting with outer turns of the optical fiber.

6. The imaging system of claim 1, wherein the fixed station is configured to transmit digital data for controlling functionalities of the aerial drone via the optical fiber.

7. The imaging system of claim 1, wherein each of the aerial drone and the fixed station each comprise an opto-electronic device configured to transform photons conveyed by the optical fiber into two distinct electrical signals, one corresponding to a control signal and the other to a video stream.

8. A single-use optical fiber reel for an aerial drone based real-time high-definition imaging system, the optical fiber reel comprising:

a quick coupling plate configured to lockably engage with and attach to the aerial drone; and a wound optical fiber coated with an adhesive substance to prevent premature unwinding of the optical fiber wound on the reel, one end of the optical fiber being configured to be coupled to an optical connector of the aerial drone and another end of the optical fiber being configured to be coupled to an optical connector of a fixed station.

9. A horizontal rotary-wing drone configured to be remotely piloted by way of a control device, the drone comprising:

at least one high-definition image sensor configured to produce an image stream; and a reel of optical fiber configured to be unwound from an inner surface of the reel, one end of the optical fiber being coupled to an optical connector of the drone and another end being configured to couple to an optical connector of a fixed station.

* * * * *